US009003669B2

(12) United States Patent
Walker

(10) Patent No.: US 9,003,669 B2
(45) Date of Patent: Apr. 14, 2015

(54) WEAR GAUGE FOR OILFIELD TOOLS

(71) Applicant: Michael Walker, Bakersfield, CA (US)

(72) Inventor: Michael Walker, Bakersfield, CA (US)

(*) Notice: Subject to any disclaimer, the term of this patent is extended or adjusted under 35 U.S.C. 154(b) by 0 days.

(21) Appl. No.: 14/094,411

(22) Filed: Dec. 2, 2013

(65) Prior Publication Data

US 2014/0082950 A1    Mar. 27, 2014

Related U.S. Application Data

(63) Continuation of application No. 13/209,963, filed on Aug. 15, 2011, now Pat. No. 8,595,945.

(51) Int. Cl.
*G01B 5/08* (2006.01)
*G01B 3/34* (2006.01)

(52) U.S. Cl.
CPC ... *G01B 3/34* (2013.01); *G01B 5/08* (2013.01)

(58) Field of Classification Search
CPC .......... G01B 3/166; G01B 5/08; G01B 3/022; G01B 3/24; G01B 5/12
USPC ......... 33/201, 501.05, 501.08, 501.45, 555.1, 33/555.2, 501.5
See application file for complete search history.

(56) References Cited

U.S. PATENT DOCUMENTS

| | | |
|---|---|---|
| 2,959,981 A | 11/1953 | Beckham |
| 3,913,188 A | 10/1975 | Grassi |
| 4,649,651 A | 3/1987 | Case |
| 5,050,310 A | 9/1991 | Jiles |
| 5,154,003 A | 10/1992 | Moore |
| 6,578,281 B2 | 6/2003 | Takahashi |
| 6,754,973 B2 | 6/2004 | Takahashi |
| 6,817,110 B2 | 11/2004 | Bohnengel |
| 6,904,941 B2 | 6/2005 | Howard |
| 8,595,945 B2 * | 12/2013 | Walker ............................ 33/201 |
| 2002/0011005 A1 | 1/2002 | Takahashi |
| 2002/0162238 A1 | 11/2002 | Bakke |
| 2010/0327576 A1 | 12/2010 | Linhorst |
| 2012/0248767 A1 | 10/2012 | Lippka |
| 2012/0312552 A1 | 12/2012 | Rayssiguier |
| 2013/0042490 A1 | 2/2013 | Walker |
| 2014/0082950 A1 * | 3/2014 | Walker ............................ 33/201 |

* cited by examiner

Primary Examiner — Yaritza Guadalupe-McCall
(74) Attorney, Agent, or Firm — James M. Duncan, Esq.; Klein DeNatale Goldner

(57) ABSTRACT

A wear gauge confirms the acceptability of an outside diameter of a down hole drilling tool for down hole service. An embodiment of the wear gauge has two arcuate members pivotally connected in overlapping attachment, where each arcuate member has opposing ends and an arc length is defined between the two ends. Each of the opposing ends has an aperture penetrating through the width of the arcuate member. The free ends may be pivoted together into an overlapping configuration into a closed position. When in the closed position, the two arcuate members define a circle. The diameter of the circle is certified to be a specific value within a designated tolerance.

20 Claims, 4 Drawing Sheets

WEAR GAUGE FOR OILFIELD TOOLS

CROSS-REFERENCE TO RELATED APPLICATIONS

This is a continuation application of U.S. application Ser. No. 13/209,963 filed on Aug. 15, 2011, to which application this inventor claims domestic priority.

BACKGROUND OF THE INVENTION

A gauge ring is a precisely machined measurement device, typically fabricated from steel or similar durable material, which has a specified internal diameter, which diameter is typically independently verified. In the field of the present invention, the gauge ring is used to confirm the dimensional compatibility of various tools and equipment which must pass through restrictions which may be present in an oil or gas well. Such restrictions include the inside diameters of casing, wellheads, open-hole portions of a well, liner hangers, etc. For purposes of the present invention, the downhole tools which must pass through such restrictions specifically include the general class of tools known as stabilizers. This class of tools includes integral blade stabilizers, welded blade stabilizers, replaceable sleeve stabilizers, non-rotating rubber sleeve stabilizers, replaceable wear pad stabilizers, roller reamers and combination reamers/stabilizers.

Gauge rings utilized in the oil industry are normally of two types. Go ring gauges provide a precision tool for comparative gauging based on a fixed limit. With respect to down hole tools, go gauges provide an indication of whether the tool, along its entire length, has a diameter which may safely be run into a wellbore and through any restrictions contained therein. A go ring gauge's dimensions are based on the maximum OD tolerance of the down hole tool being gauged. In comparison, no-go or not-go gauges provide a precision tool for production comparative gauging based on a fixed limit. No-go gauges consist of a fixed limit gauge with a gauging limit based on the minimum or maximum tolerances of the inspected part. With respect to down hole tools, a no-go ring gauge's dimensions are based on the minimum OD tolerance of the tool.

Failure to confirm the compatibility of the dimensions of a downhole tool can have substantial adverse consequences. If the tool is too large, it can become stuck in a reduced diameter section of the well. If the tool is unknowingly undersized, for example a reamer, the well diameter may not be as large as believed by the drilling personnel. This situation can result in the running of tools which are too large for the well diameter, and the sticking of tools and casing in the reduced diameter portion of the well.

In the case of go-ring testing, the common method of verifying whether the diameter of a stabilizer is safe to run is by sliding a steel gauge ring over the entire length of the tool to reach the largest outside diameter section. If the ring slides over the entire length, the tool is safe to run. In this method, the internal diameter of the steel gauge ring is first verified and certified by a third party, such that the actual diameter is known within an accepted tolerance. However, this method has some disadvantages. First, the ring must be slid around much of the length of the stabilizer until reaching the largest diameter sections around the stabilizer blades. This process can be time consuming because the stabilizer will usually be several feet in length, thereby requiring the ring to be lifted around much of the length of the stabilizer before reaching the larger diameter blade sections. It can also be uncomfortable for the person having to bend down and pull the ring up over the blades. Finally, because many of these operations take place directly over the well opening, it is possible for the steel ring gauges to fall downhole. Because of their steel construction, the loss of a ring gauge downhole can cause substantial difficulties, because of the difficulties which may be encountered in trying to drill up the device.

SUMMARY OF THE INVENTION

Embodiments of the presently disclosed invention provide a solution to the need identified above. The disclosed invention is a wear gauge which confirms the acceptability of an outside diameter of a down hole drilling tool for down hole service in a particular application. For example, if an open-hole section of well is desired to be reamed to a known diameter, the wear gauge confirms that the reamer to be utilized in the application has a blade diameter which will achieve the desired opening. An embodiment of the wear gauge has two arcuate members pivotally attached to one another with a pin, where each arcuate member has opposing ends and an arc length defined between the two ends. Each of the opposing ends has an aperture penetrating through the width of the arcuate member. The attached ends of the arcuate members are connected in overlapping attachment, while the free ends may be pivoted together into an overlapping configuration into a closed position.

When in the closed position, the two arcuate members define a circle. The diameter of the circle is certified to be a specific value within a designated tolerance. The wear gauge is closed around the largest outside diameter of the down hole drilling tool. If the wear gauge cannot be closed, clearly the outside diameter of the down hole drilling tool is larger than the certified diameter of the wear gauge. If the wear gauge is closed, a determination may be made whether the difference between the certified diameter and the actual diameter of the down hole drilling tool is within acceptable tolerances. Embodiments of the disclosed wear gauge may be fabricated from materials which may easily be fragmented and recovered if the wear gauge inadvertently falls down hole.

DETAILED DESCRIPTION OF THE EMBODIMENTS

Figure 1:
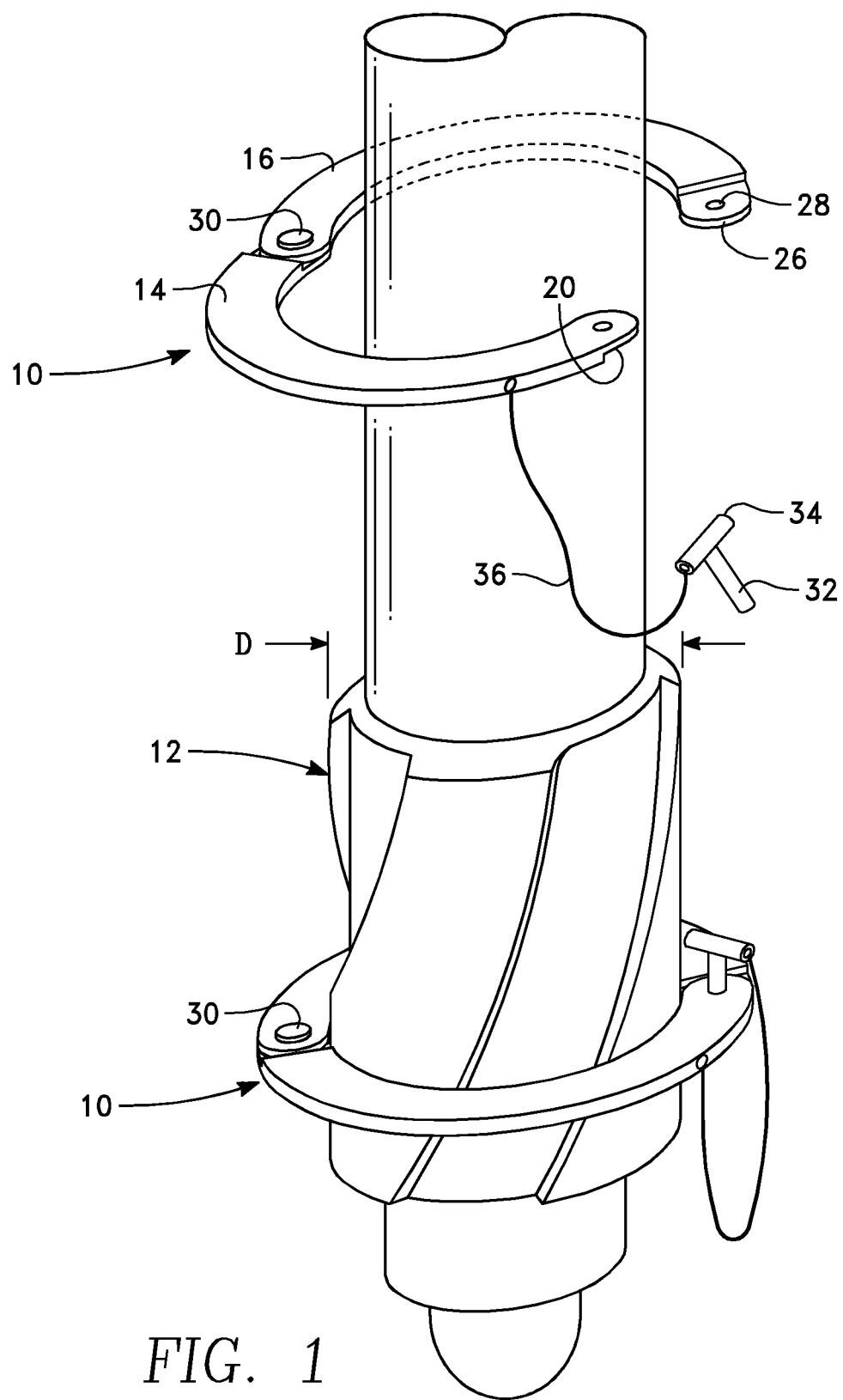
FIG. 1 shows a perspective view of an embodiment of the disclosed wear gauge as it is being installed, and after being installed, on a downhole oilfield tool.

Referring now to the figures, embodiments of the disclosed wear gauge 10 are utilized for confirming the acceptability of an outside diameter D of a down hole drilling tool 12. The wear gauge 10 has a first arcuate member 14 and a second arcuate member 16. The first arcuate member 14 has an arc length $L_1$. First arcuate member 14 has a first end 18 and a second end 20. First end 18 has an aperture 22 extending through its width. Second end 20 has an aperture 28 extending through its width Likewise, second arcuate member 16 has an arc length $L_2$, a primary end 24 and a secondary end 26. The primary end 24 has aperture 22 extending through its width and the secondary end 26 has aperture 28 extending through its width. The arc length $L_1$ of the first arcuate member 14 and the arc length $L_2$ of the second arcuate member 16 may be the same. For ease of fabrication, the first arcuate member 14 and the second arcuate member 16 may be identical.

Figure 3:
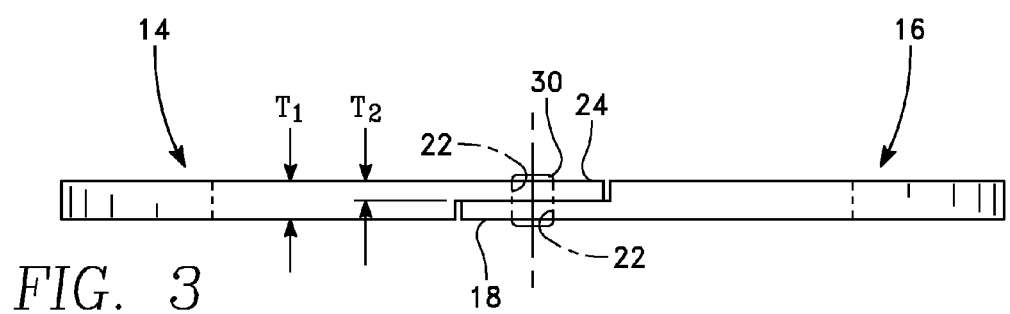
FIG. 3 shows a side view of an embodiment of the disclosed wear gauge.

The two arcuate members 14, 16 are pivotally connected at the first end 18 and the primary end 24 by a pivot pin 30. As best shown in FIG. 3, the first end 18 and the primary end 24 are connected together in overlapping attachment by pin 30 which is inserted through overlapping apertures 22. As indicated in FIG. 3, the thickness $T_2$ of the wear gauge 10 at each of the ends of the arcuate members 14, 16 is substantially less than the thickness $T_1$ which exists along the remainder of the arc lengths $L_1$, $L_2$ excluding the ends 18, 20, 24, 26. As suggested by FIG. 3, $T_2$ may be one half the thickness of $T_1$. As further indicated in FIG. 3, in the closed position the wear gauge 10 may have a uniform thickness along its entire circumference. Thickness $T_2$ for each of the ends 18, 20, 24, 26 may, but is not required, to be the same for each end. As shown in FIG. 1, the first arcuate member 14 may, with respect to the second arcuate member 16, pivot to a closed position around a downhole drilling tool 12. When the wear gauge 10 is so closed, the aperture 28 of the second end 20 and the aperture 28 of the secondary end 26 are in overlapping alignment. A second pin 32 may be manually inserted into the overlapping apertures 28. Second pin 32 may have a handle 34 which may be in the form of a tee handle as shown in FIG. 1, or be in the form of a knob or other easily grasped structure. Second pin 32 may be attached to either first arcuate member 14 or second arcuate member 16 with tethering means, such as leash 36.

When so installed with the wear gauge 10 in a closed position, the first arcuate member 14 and the second arcuate member 16 define a circle having a diameter $D_c$ which has been previously certified, usually according to API (American Petroleum Institute) requirements, to be a specified diameter within approved tolerances.

Figure 2:
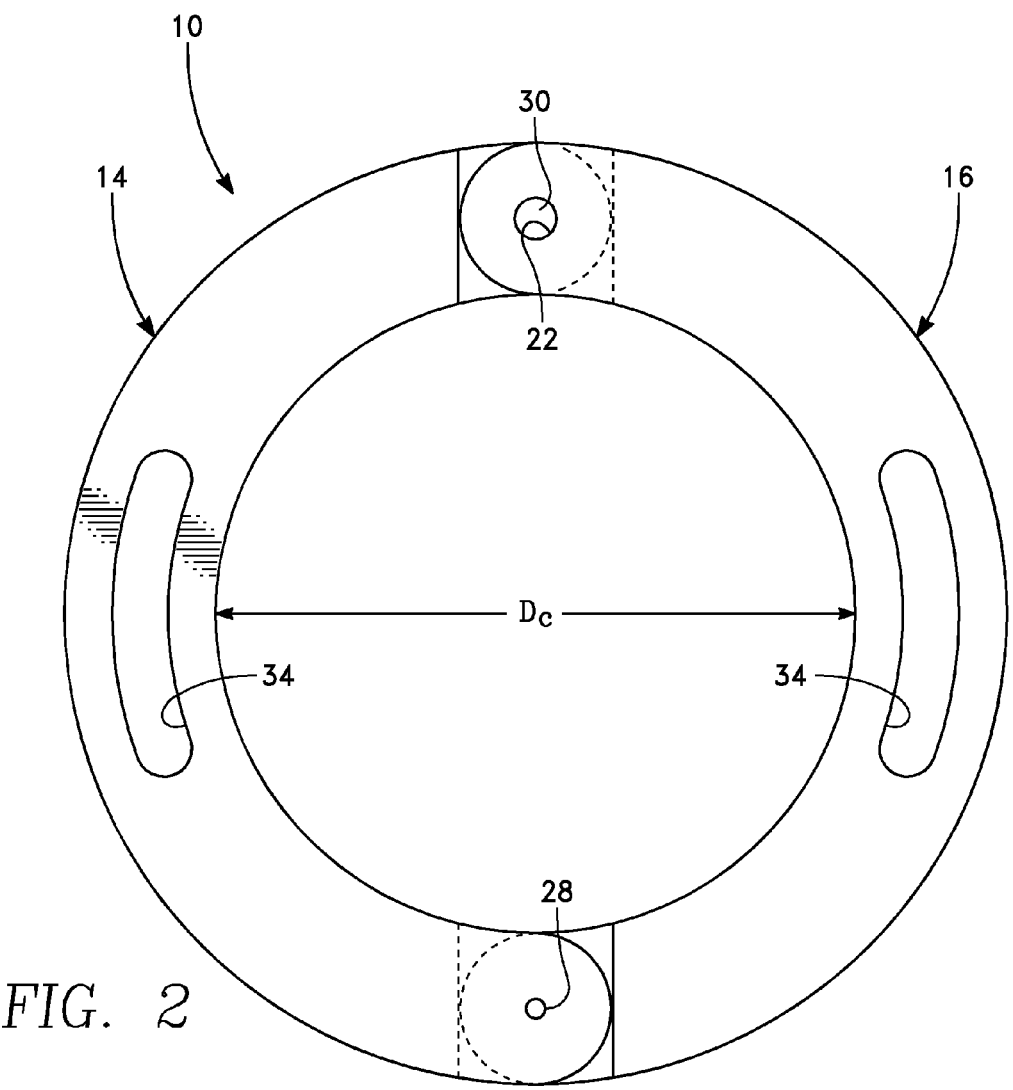
FIG. 2 shows a top view of an embodiment of the disclosed wear gauge in the closed position.
Figure 4:
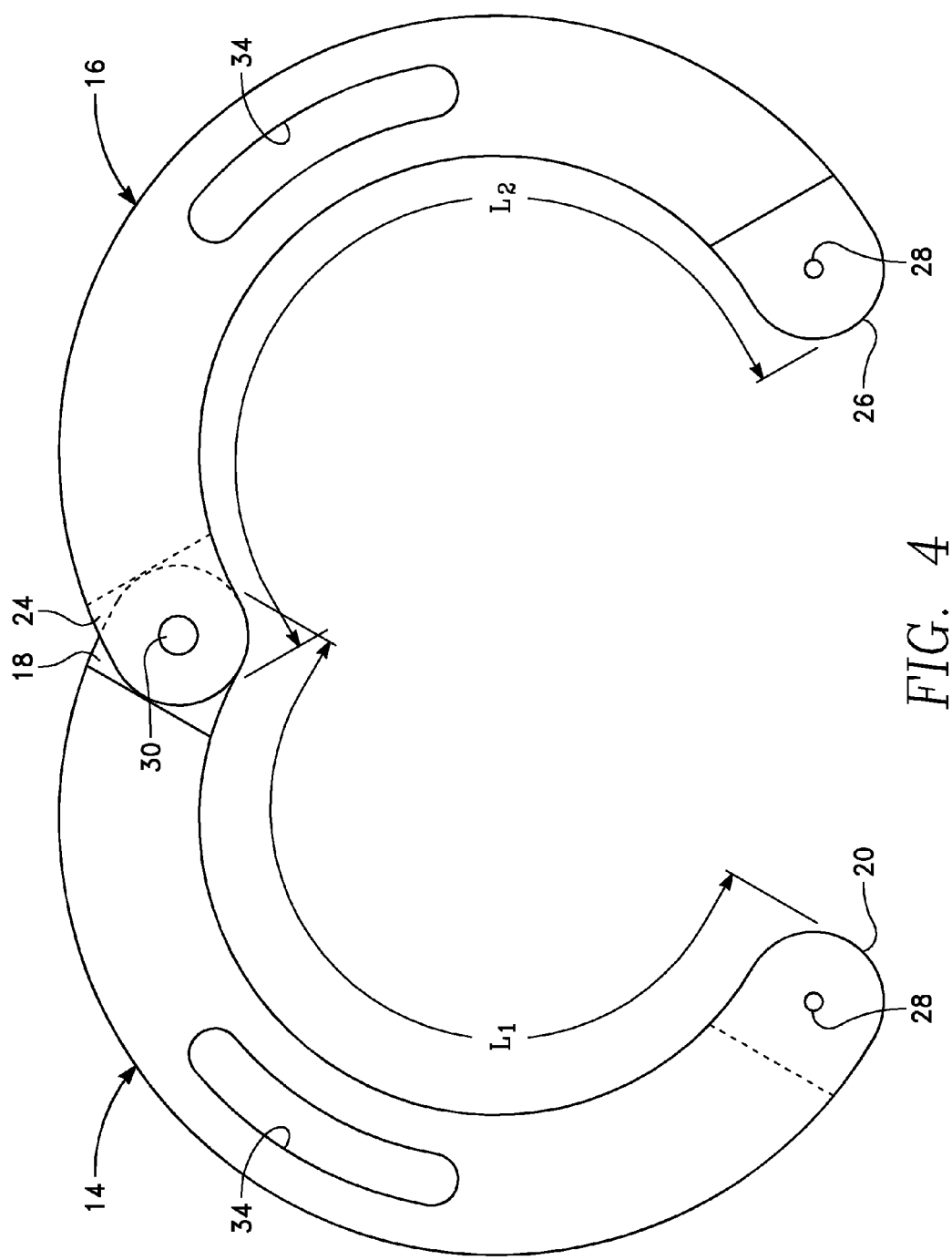
FIG. 4 shows a top view of an embodiment of the disclosed wear gauge in an open position.
Figure 5:
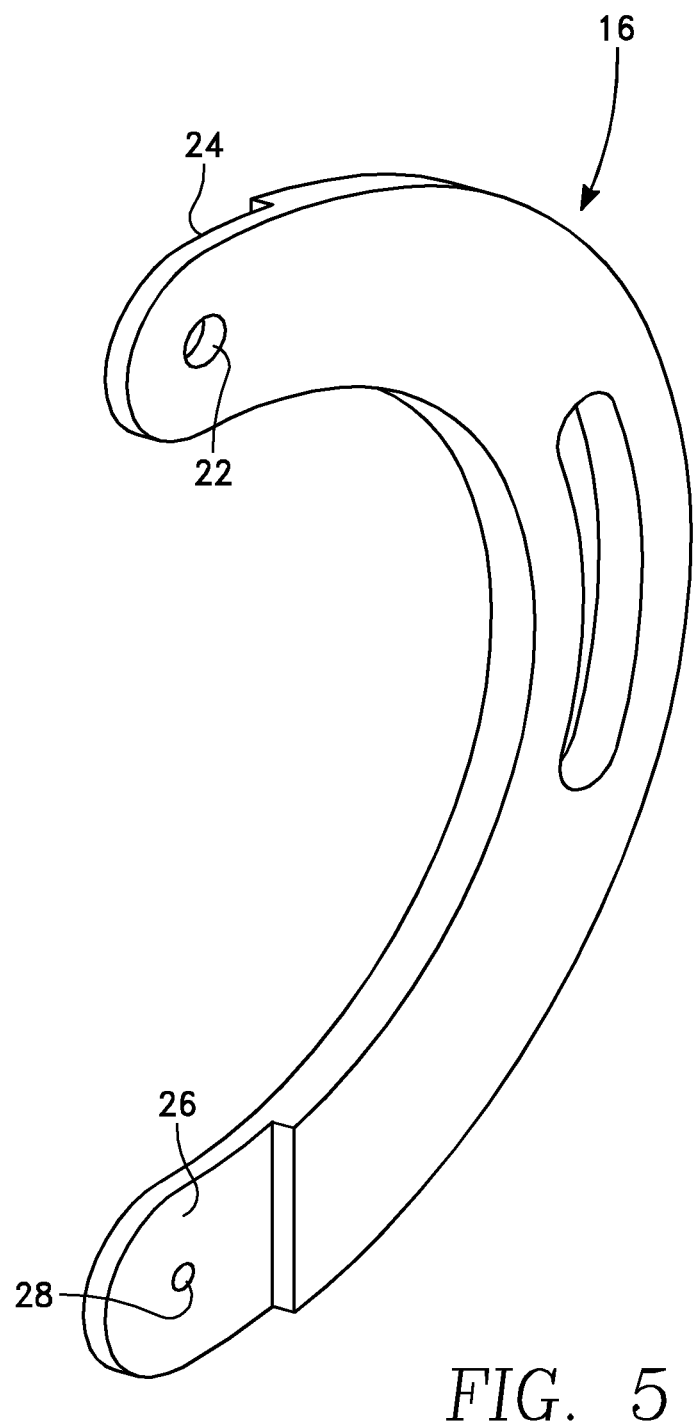
FIG. 5 shows a perspective view of an embodiment of an arcuate member which may be utilized in the disclosed wear gauge.

As shown in FIGS. 2, 4 and 6, the first arcuate member 14 and/or the second arcuate member 16 may have an arcuate opening 34 which extend along a portion of the respective arc lengths $L_1$, $L_2$. The arcuate openings 34 may be included to decrease the weight of the wear gauge 10, or to facilitate drilling up the wear gauge should it inadvertently fall downhole. In addition, while the wear gauge 10 may be fabricated from a variety of different metallic or plastic materials, a ultra high molecular weight polyethylene provides many desired qualities, including weight, durability, and ease to drill into pieces which are easily circulated out of a well should the gauge fall downhole.

Embodiments of the above described invention may be utilized in a method of ascertaining whether an outside diameter D of a down hole drilling tool 12 is within acceptable tolerance. In the method, a wear gauge 10 is manufactured such that the wear gauge has a first arcuate member 14 which is pivotally attached to a second arcuate member 16, such that the first arcuate member and the second arcuate member, when closed, define a circle of a particular diameter $D_c$. This diameter is certified to have a specified measurement within accepted tolerances. Upon delivery to a well site, the gauge is closed to a closed position around the largest outside diameter D of the drill tool 12 to be measured, where the drill tool has been made up within a drilling string. Upon the gauge 10 being closed, a determination may be made whether the difference between the certified diameter $D_c$ and the largest outside diameter D of the drilling tool 12 is within an acceptable range of values. The wear gauge 10 utilized in the method may have the different structural features described above for the apparatus itself.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following appended claims.

What is claimed is:

1. A wear gauge for confirming the acceptability of an outside diameter of a down hole drilling tool, the wear gauge comprising:
   a first arcuate member having a first arc length, a first end and a second end, the first end and the second end each having a reduced thickness and an aperture extending there through;
   a second arcuate member having a second arc length, a primary end and a secondary end, the primary end and the secondary end each having a reduced thickness and an aperture extending there through;
   a first pin which pivotally attaches the first end to the primary end in overlapping attachment, the overlapping first end and primary end defining a first thickness;
   wherein the first arcuate member may, with respect to the second arcuate member, pivot to a closed position around the downhole drilling tool in which the aperture of the second end and secondary end are in overlapping alignment so as to receive the manual insertion of a second pin, the overlapping second end and secondary end defining a second thickness; and
   the first arcuate member and the second arcuate member defining, in the closed position, a circle having a circumference equivalent to the first arc length plus the second arc length, wherein the circumference defines a diameter which is certified within a designated tolerance.

2. The wear gauge of claim 1 wherein the first arc length and the second arc length are the same.

3. The wear gauge of claim 2 wherein the first arcuate member and the second arcuate member are identical.

4. The wear gauge of claim 1 wherein the first arcuate member comprises an arcuate opening extending along a portion of the first arc length.

5. The wear gauge of claim 1 wherein the first arcuate member and the second arcuate member are fabricated from a plastic material.

6. The wear gauge of claim 5 wherein the plastic material is ultra high molecular weight polyethylene.

7. The wear gauge of claim 1 wherein the first thickness and the second thickness are equivalent.

8. The wear gauge of claim 1 wherein the wear gauge, in the closed position, has substantially a uniform thickness along its entire circumference.

9. The wear gauge of claim 1 wherein the second pin has a handle member.

10. The wear gauge of claim 9 wherein the handle member has a tee handle.

11. The wear gauge of claim 1 wherein the second pin is attached to either the first arcuate member or the second arcuate member with a tethering means.

12. A wear gauge for confirming the acceptability of an outside diameter of a down hole drilling tool, the wear gauge comprising:

a first arcuate member having a first arc length, a first end and a second end, the first end and the second end each having a reduced thickness and an aperture extending there through;

a second arcuate member having a second arc length, a primary end and a secondary end, the primary end and the secondary end each having a reduced thickness and an aperture extending there through;

a first pin which pivotally attaches the first end to the primary end in overlapping attachment, the overlapping first end and primary end defining a first thickness;

wherein the first arcuate member may, with respect to the second arcuate member, pivot to a closed position around the downhole drilling tool in which the second end and the secondary end are overlapping parallel to the plane of pivot of the first arcuate member, and the aperture of the second end and secondary end are in overlapping alignment so as to receive the manual insertion of a second pin, the overlapping second end and secondary end defining a second thickness; and the first arcuate member and the second arcuate member defining, in the closed position, a circle having a circumference equivalent to the first arc length plus the second arc length, wherein the circumference defines a diameter which is certified within a designated tolerance.

13. The wear gauge of claim 12 wherein the first arc length and the second arc length are the same.

14. The wear gauge of claim 13 wherein the first arcuate member and the second arcuate member are identical.

15. The wear gauge of claim 12 wherein the first arcuate member comprises an arcuate opening extending along a portion of the first arc length.

16. The wear gauge of claim 12 wherein the first thickness and the second thickness are equivalent.

17. The wear gauge of claim 12 wherein the wear gauge, in the closed position, has substantially a uniform thickness along its entire circumference.

18. The wear gauge of claim 12 wherein the second pin has a handle member.

19. The wear gauge of claim 18 wherein the second pin is attached to either the first arcuate member or the second arcuate member with a tethering means.

20. The wear gauge of claim 18 wherein the handle member has a tee handle.

* * * * *